United States Patent [19]

Rossle

[11] Patent Number: 5,290,327
[45] Date of Patent: Mar. 1, 1994

[54] DEVICE AND ALLOTHERMIC PROCESS FOR PRODUCING A BURNABLE GAS FROM REFUSE OR FROM REFUSE TOGETHER WITH COAL

[76] Inventor: Gottfried Rossle, Geisnangstrasse 3, D-7140 Ludwigsburg, Fed. Rep. of Germany

[21] Appl. No.: 654,633
[22] PCT Filed: Aug. 19, 1989
[86] PCT No.: PCT/DE89/00545
   § 371 Date: Sep. 30, 1991
   § 102(e) Date: Sep. 30, 1991
[87] PCT Pub. No.: WO90/02162
   PCT Pub. Date: Mar. 8, 1990

[30] Foreign Application Priority Data
   Aug. 23, 1988 [DE] Fed. Rep. of Germany ....... 3828534

[51] Int. Cl.⁵ ............................................. C10J 3/00
[52] U.S. Cl. .......................................... 48/111; 48/73; 48/197 A; 48/197 R; 48/202; 48/209; 60/39.12; 110/222; 110/229; 110/245; 201/7; 201/21; 201/25; 202/105; 202/226
[58] Field of Search ............ 48/209, 111, 197 R, 48/197 A, 202, 73; 60/39.12; 110/222, 229, 245; 202/105, 131, 136, 226; 201/2.5, 21, 25, 7, 32, 33

[56] References Cited

U.S. PATENT DOCUMENTS

| | | | |
|---|---|---|---|
| 2,743,217 | 4/1956 | Slisby | 202/17 |
| 3,886,873 | 6/1975 | Sundquist et al. | 48/197 A X |
| 3,912,465 | 10/1975 | Kunii et al. | 48/202 X |
| 4,028,068 | 6/1977 | Kiener | 48/197 R X |
| 4,300,915 | 11/1981 | Schmidt et al. | 48/197 R |
| 4,322,222 | 3/1982 | Sass | 48/197 R |
| 4,544,374 | 10/1985 | Mallek et al. | 48/111 |
| 4,667,467 | 5/1987 | Archer et al. | 48/202 X |
| 4,840,129 | 6/1989 | Jelinek | 48/111 X |
| 4,852,996 | 8/1989 | Knop et al. | 48/197 R |
| 4,878,440 | 11/1989 | Tratz et al. | 110/229 X |
| 5,064,444 | 11/1991 | Kubiak et al. | 48/73 X |

FOREIGN PATENT DOCUMENTS

| | | |
|---|---|---|
| 2927240 | 7/1979 | Fed. Rep. of Germany ... C10J 3/66 |
| 2943309 | 10/1979 | Fed. Rep. of Germany ... C10J 3/66 |
| 3004111 | 2/1980 | Fed. Rep. of Germany ... C10J 3/66 |
| 3048215 | 12/1980 | Fed. Rep. of Germany ... C10J 3/66 |
| 3228532 | 7/1982 | Fed. Rep. of Germany ... C10J 3/54 |
| 3433238 | 9/1984 | Fed. Rep. of Germany ... C10J 3/54 |
| WO88/02769 | 10/1987 | PCT Int'l Appl. ............ C10J 3/54 |
| 2069861 | 2/1981 | United Kingdom ......... F27B 15/00 |

OTHER PUBLICATIONS

Rost, M., van Heek, K. H., Knop, K.: Umweltfreundliche Stromerzeugung durch Einsatz der allothermen Kohlevergasung nach dem MBG-Verfahren. In: VBG Kraftwerkstechnik, vol. 68 (1988), Heft 5, pp. 461 to 468.

Primary Examiner—James C. Housel
Assistant Examiner—Maureen M. Wallenhorst
Attorney, Agent, or Firm—Walter A. Hackler

[57] ABSTRACT

A method for generating, from refuse or refuse in combination with coal, a fuel gas suited for public utility purposes wherein refuse and coal can be introduced into the process in any proportion one to the other. The method provides the steps of subjecting the refuse to allothermal low-temperature carbonization, if desired in combination with coal, burning the gasification residue, purifying the crude gas and conditioning the pure gas for public utility purposes.

20 Claims, 2 Drawing Sheets

DEVICE AND ALLOTHERMIC PROCESS FOR PRODUCING A BURNABLE GAS FROM REFUSE OR FROM REFUSE TOGETHER WITH COAL

BACKGROUND OF THE INVENTION

The present invention relates to a process for generating, from refuse or refuse in combination with coal, a fuel gas suited for public utility purposes.

For the purposes of the present invention, the term refuse is used to describe refuse containing energy, for example domestic refuse and other refuse, such as industrial refuse, including for example also waste wood and other kinds of biomass. The term refuse containing energy as used herein is meant to describe refuse containing carbon.

There have been known substantially three different methods for the thermal utilization of refuse:
1. Refuse incineration
2. Low-temperature carbonization of refuse
    a) with subsequent combustion of the low-temperature carbonization products
    b) with a subsequent refining step and combustion of the low-temperature gas.

Hereafter, the typical forms of implementation of the known methods will be described, together with their disadvantageous results and effects:

REFUSE INCINERATION

The refuse is burnt in a furnace, and the heat contained in the flue gas is transferred to a steam boiler.

The energy contained in the steam is used to produce electric current and remote heat.

This utilization requires a complex electric remote distribution system and remote heat network.

The efficiency of the electric power generation process is low, due to the unfavorable handling properties of the refuse.

As regards the separation of re-usable components, this is substantially limited to lumpy ferrous metals which can be separated and recycled.

All the other metals get into the incineration process.

The reactive substances, such as sulfur and heavy metals, assume their mostly toxic oxide state—this process being aided by the required high rate of excess air—and have to be removed from great volumes—because of the excess air—of flue gas by a complex cleaning process.

Sulfur dioxide develops which is converted to gypsum by the addition of lime, and the gypsum then has to be disposed of by costly processes.

The denitrogenation process is rather difficult due to the fact that the catalytic poisons still contained in the flue gas heavily impair the service life of the catalysts.

The present state of the art is not in a position to propose denitrogenation plants for refuse incineration processes.

The nitrogen oxides emitted at great height produce photo-oxidants (ozone) under the effect of the sun, thus contributing to the problem of dying forests.

Due to the high oxygen excess in the presence of numerous other chemical substances, there is also the risk that extremely toxic organic contaminants (such as dioxine) may develop.

LOW-TEMPERATURE CARBONIZATION OF REFUSE

The refuse is carbonized in a low-temperature gas generator (rotary drum heated by tubular heat exchangers) at a temperature of about 450° Centigrade, in the absence of air and/or oxygen (allothermal without gasifying whereby a low-temperature gas is generated.

The ferrous metals can be separated out before, practically all other metals, and further inert materials (stones, glass) can be separated out after the low-temperature carbonization process.

The development of toxic oxides and toxic organic compounds is impossible, due to the allothermal operation of the process.

In the reducing atmosphere of the low-temperature carbonization drum, the metals are given the surface typical of the particular metal, and can be recycled for further use after separation from the carbonization residues.

a) With subsequent combustion of the low-temperature carbonization products

The carbonization residues are ground in a mill, burnt together with the low-temperature gas in a high-temperature slag-tap furnace, and the heat contained in the flue gas is transmitted to a steam boiler.

The energy contained in the steam is used to produce electric current and remote heat.

This utilization requires a complex electric remote distribution system and remote heat network.

The efficiency of the generation of electric current should be more favorable as compared with the process described under 1) above, due to the better handling properties of the low-temperature carbonization products, as compared with refuse.

During the combustion process, certain components of carbonization residues change over to their mostly toxic oxide form and have to be removed from the flue gas—which in this case, too, arises in quite considerable volumes, in spite of the low rate of excess air, by a complex cleaning process.

Sulfur dioxide develops which is converted to gypsum by the addition of lime, and the gypsum then has to be disposed of by complex processes.

The high-temperature combustion gives rise to large quantities of nitrogen oxides.

As regards the removal of nitrogen in high-temperature slag-tap furnaces, no satisfactory solution has been found to this day.

The nitrogen oxides emitted at great height produce photo-oxides (ozone) under the effect of the sun, thus contributing to the problem of dying forests.

b) With a subsequent refining step and combustion of the low-temperature gas

The low-temperature gas is refined by partial combustion (autothermal process) in the presence of air, and the resulting crude gas is purified. During the refining process, large-molecular carbon compounds are reduced to small-molecular carbon compounds.

The pure gas is a poor gas, due to the nitrogen absorbed in the refining stage, and is not suited for public utility purposes.

The pure gas can be converted to electric current and remote heat only at the very place.

A complex electric distribution network and a complex remote heat network are required.

The low-temperature carbonization residue, which still contains a substantial part of the energy content of the refuse introduced into the process, cannot be further utilized thermally, due to the pollutant emissions that have to be expected.

The energetic efficiency of the process, therefore, is only low.

In the refining stage, the gas volume is increased, and as a result the purification plants also have to handle larger volumes.

However, due to the (below-stoichiometric) air supply, undesirable oxidations can hardly develop.

Sulfur is present in the crude gas practically only in the form of hydrogen sulfide and can be washed out simply by liquid purification.

Elementary sulfur of a high purity degree can be recovered.

Thanks to the existing possibilities of catalytic reduction, nitrogen oxides are produced in only very small quantities by the combustion of the pure gas.

For thermal utilization of coal, there has been known an allothermal coal/water vapor fluid-bed gasification process.

According to this process, coal dust is reduced to a crude gas at a temperature of about 850° Centigrade, in the absence of air and/or oxygen, in an externally heated crude gas generator (water vapor fluid-bed gasification reactor with tubular heat exchangers), using exclusively water vapor as a gasification medium.

SUMMARY OF THE INVENTION

Now, it is the object of the present invention to provide a process and a device enabling a fuel gas suited for public utility purposes to be produced from refuse, or refuse in combination with coal.

The process proposed by the invention for producing a fuel gas suited for public utility purposes from refuse containing energy, or from refuse containing energy in combination with coal, comprises the steps of producing from the refuse a low-temperature gas and a low-temperature carbonization residue in an externally heated low-temperature gas generator, in the absence of air and/or oxygen (allothermal process) and without any addition of gasification media, reducing the low-temperature carbonization residue, either without the addition of coal or with the addition of a desired quantity of coal, in a mill to a fine-grained product, hereafter called dust, generating from the low-temperature gas and the dust a crude gas and a gasification residue, in an externally heated crude gas generator, in the absence of air and/or oxygen (allothermal process) using water as a gasification medium, producing a pure gas from the crude gas by purification, and producing from the gasification residue a flue gas (thermal gas) in a gasification-residue combustion chamber.

The device according to the invention is characterized by fact that it comprises an allothermal low-temperature gas generator (one operating in the absence of air and/or oxygen and equipped with heat exchangers supplying the required process heat), an allothermal crude gas generator and a gasification-residue combustion chamber.

As no air or oxygen is introduced into the low-temperature carbonization process, the latter can be carried out without any substantial flow velocities or turbulences occurring in the low-temperature gas, so that the low-temperature gas emanating from the low-temperature carbonization stage contains a low rate of dust particles only. If necessary, there may be provided an additional mill for grinding the coal, or coal dust procured in this form may be added.

The gasification device serves to further convert the low-temperature gas, which provides the advantage that a uniform gas is obtained as the only gaseous end product of the process.

The gasification may be carried out at a pressure of approx. 20 bar, or at a reduced pressure of, preferably, less than 20 bar or, preferably, even less than 10 bar or, preferably, approximately at atmospheric pressure. The closer the pressure within the gasification device to the atmospheric pressure, the simpler can be the structure of such a device because then no pressure vessel, or only one for a relatively small overpressure, will be required. In addition, if the process is run at atmospheric pressure in the gasification device, no complex compressor means will be required for feeding the low-temperature gas into the gasification device at high pressure.

The advantages provided by the process and the device according to the invention, as compared with other processes for the thermal utilization of refuse, are seen in the fact that a fuel gas suited for public utility purposes can be produced from the refuse, and that the process is not restricted —as are all the other refuse utilization processes described before—to the supply of electric current and remote heat;

that due to the fact that the energy is made available in gaseous form, substantial costs can be saved, Which would otherwise be caused by electric current and remote-heat distribution systems, and the generation of electric current and heat can be decentralized;

that the possibility to decentralize the generation of electric current helps save stand-by units;

that the possibility to make use of decentralized power stations reduces the need for large power stations and allows gas generators to be erected at the sites of abandoned coal-fired power stations;

that it is now possible to offer a low-cost and competitive coal gasification process in combination with the—anyway indispensable—disposal of refuse;

that—for covering peak loads in public gas networks—coal of any grade can be used, in any mixing ratio With the refuse to be disposed of, and that the plants are no longer restricted either to refuse or to coal, as is the case with all other thermal processes for the utilization of refuse or coal;

that approximately 95% of the energy contained in the refuse can be put to useful purposes through the carbonization process and that—in contrast to the process described under 2 b above—no substantial part of the energy content remains in the residue which cannot be utilized energetically;

that the gas purification process can be carried out on the smallest possible gas volume and not on the large—as in the case of the processes 1 and 2 a—or enlarged gas volume—as in the case of process 2 b;

that the gas purification process is relatively unproblematic due to the fact that approximately 5% only of the reactive substances are subjected to combustion so that oxidation will occur only to this extent—as compared to the 100% in the case of processes 1 and 2 a;

that the flue gas volume is extremely small, equaling only 3% of that produced by processes 1 and 2 a;

that for removing the sulfur content (from the crude gas), a simple liquid purification process is required only, as compared with the expensive and complex flue-gas desulfurization system comprising the use of lime and the disposal of gypsum, as required for processes 1 and 2 a;

that when burning the flue gas at decentralized consumer points, this can be done without any catalysts due to the low-pollutant hydrogen combustion, and the internal-combustion engines of the power stations can be operated on a lean mixture, without any need for catalysts, as in the case of the processes 1 and 2 a;

that due to the reduction of the combustion share to approximately 5% and the possibility to make use of the fluid-bed combustion process, the emissions of nitrogen oxide can be expected to be small and no substantial emissions of nitrogen oxides have to be expected due to high combustion temperatures, and this even at great geodetical height (high chimneys—development of photo-oxidants—dying forests)—as in the case of process 1 and, in particular, process 2 a.

The invention also includes the utilization of the intermediate products and of final products, as specified in the claims.

Although the process, up to and including the generation of crude gas, preferably also including the generation of the pure gas and the combustion of the gasification residues and of other substances in a high-temperature slag-tap furnace or a fluid-bed furnace, is carried out conveniently in a single plant, there is also the possibility to store the low-temperature carbonization residue intermediately for gasification at a suitable point in time, or else to transport it to a different place for gasification at that place. In the latter case, the high-temperature furnace should, preferably, be located at one and the same place as the gasification system.

The invention allows refuse and coal (such as pit coal or brown coal) to be introduced into the process commonly, at any desired mixing ratio. The method according to the invention preferably uses the allothermal low-temperature gas generator known from low-temperature refuse carbonization processes, and the allothermal crude gas generator known from coal gasification processes, in combination with a number of other components, but uses them in a novel arrangement especially tuned to the objects to be achieved by the process.

The low-temperature carbonization process conveniently is controlled in such a way as to produce the greatest possible quantity of low-temperature gas, and to leave carbonization residues only in the form of solid components. The low-temperature carbonization process is carried out, preferably, at or about atmospheric pressure.

The process according to the invention permits the production of a fuel gas suited for public utility purposes, having a calorific value, of 4.6 kWh/m$^3$ and the following chemical composition: 83% hydrogen, 16% methane, 1% nitrogen.

BRIEF DESCRIPTION OF THE DRAWINGS

Other features and advantages of the invention will appear from the following description of certain embodiments of the invention described by reference to the drawing, which shows details of essential features of the invention, and from the claims. It is understood that the individual features may be implemented in any embodiment of the invention either individually, or in any combination thereof.

Figure 1:
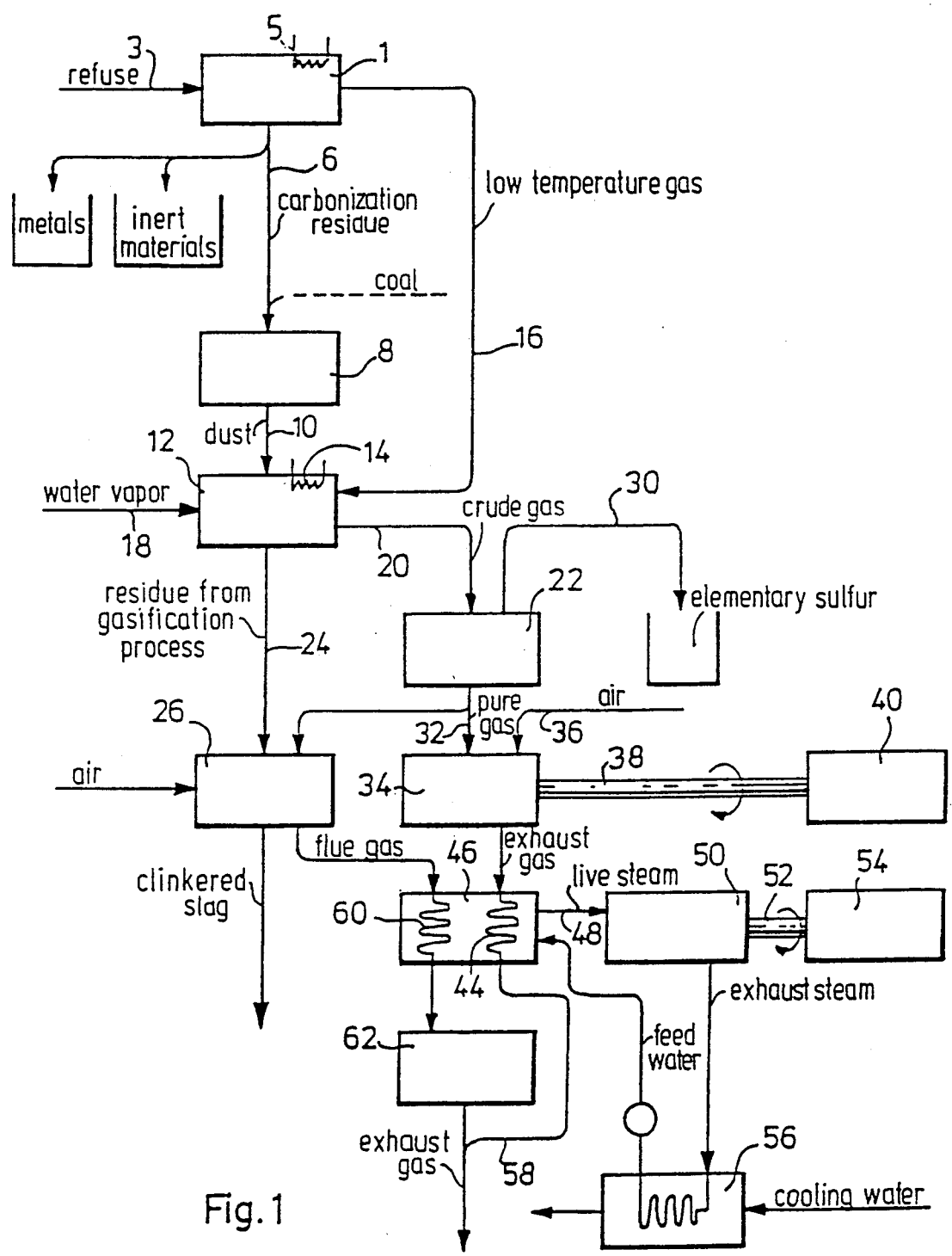
FIG. 1 shows diagrammatically the functional blocks of a first plant for the utilization of refuse containing energy, and the manner in which these functional blocks are coupled.

The path taken by the different substances through the plant illustrated in FIG. 1 is indicated by arrows. If a gas is to be transported, these arrows indicate pipelines, if solids are to be transported, the arrows may be interpreted as indicating conveyer belts or other transport means.

DETAILED DESCRIPTION

A low-temperature carbonization device 1 is supplied with refuse along a path 3. Prior to being fed into the carbonization system, the refuse is reduced in size by shredders, and the iron parts are removed by magnetic separators. The low-temperature carbonization system comprises a gas-tight vessel the interior of which can be heated up via heat-exchanger means 5. In the case of the illustrated embodiment, the crude gas produced by the gasifying system 12 mentioned below flows through the heat exchanger 5, thereby heating the interior of the low-temperature carbonization device to a temperature of approximately 450° Centigrade. Any metals, such as iron, copper, aluminium, tin plate, heavy metals, and so-called inert materials, such as stone or glass, that may be contained in the carbonization residue, can be sorted out. This is illustrated diagrammatically in the drawing. The remaining solid carbonization residues are delivered along a path 6 to a coal mill 8, Where they are reduced to dust, and then to a gasification device 12, along a path 10. The low-temperature carbonization process has given rise to combustible low-temperature gas which is likewise supplied into the interior of the gasification device 12, along a conveying path 16.

The gasification device 12 comprises a gas-tight vessel which is heated up to a temperature of, for example, 800° Centigrade by a heat exchanger 14 which is passed by part of the flue gases produced by the high-temperature furnace 26 that will be described further below. The gasification device takes the form of a fluid-bed gasifier. The interior of the gasification vessel is further supplied with water vapor via the path 18, whereas no oxygen or air is introduced. The gasification device produces crude gas as a starting material which is then supplied to a purification device 22, via a conveying path 20. The residue from the gasification process, which cannot be gasified, is delivered, via a conveying path 24, to a high-temperature furnace 26, in the present example a high-temperature slag-tap furnace from the MAN company. The interior of this furnace is supplied with part of the pure gas leaving the purification device 22, and with air. Combustion takes place at a temperature of approx. 1300° Centigrade. The solid residue remaining in the high-temperature furnace is clinkered slag, a material which may possibly be utilized for road construction purposes, or else disposed of on a usual disposal site.

The purification device 22, which serves to purify the crude gas, separates out sulfur in its elementary state, which is then carried off from the purification device along the conveying path 30. Prior to purification, the crude gas is cooled—a step which is not shown in the drawing. The thermal energy derived during this process may be used at desire, for the purposes of the process or for other purposes. Other substances may also be carried off.

In the illustrated example, the greatest part of the pure gas is supplied as fuel, along a feeding path 32, to a gas turbine 34 which is simultaneously supplied with combustion air via a feeding path 36. The gas turbine 34 supplies mechanical energy to a rotating shaft 38 driving an electric generator. The electric energy produced by the latter is carried off by electric lines not shown in the drawing. The exhaust gas leaving the gas turbine is used to heat a steam boiler 46, via a heat exchanger 44, for producing live steam (water vapor) which is then supplied to a steam turbine 50, via a feeding path 48, for driving a shaft 52 which in its turn drives an electric generator 54. The exhaust steam of the steam turbine is condensed in the known manner in a condenser 56, and then returned to the steam boiler 46 as feed water. It has been assumed for the purposes of the illustrated embodiment that the exhaust gases of the gas turbine 34 do not contain any disturbing nitrogen oxide content so that once they have left the heat exchanger 44 they can be discharged into the open air via the path 58. However, there is also the possibility, if required, to clean these exhaust gases catalytically from any nitrogen oxides that may be contained therein. The use of a catalyst is possible because the pure gas supplied to the gas turbine does not contain any catalyst poisons.

The flue gas leaving the high-temperature slag-tap furnace 26 is passed through a second heat exchanger 60 likewise arranged in the steam boiler 46. This flue gas contains dusts and other contaminants which are separated out, to the extent possible, by a flue gas filtering system 62 of the type used also for filtering the flue gases in refuse incineration processes. If necessary, this filtering step can be carried out upstream of the second heat exchanger.

In the case of the illustrated embodiment, the gasification device 12 operates at atmospheric pressure. Contrary to known fluid-bed gasifiers, the fluid-bed gasifier used in the illustrated example may have a reduced wall thickness, being not subjected to overpressure. However, the gasifying tank must be greater in the case of a system operating at atmospheric pressure than in the case of a system operating at an overpressure of, for example, 20 bar, always related to the same gas volume produced per unit of time.

The content of contaminants emitted into the atmosphere is particularly low in the case of the process and the device according to the invention.

Figure 2:
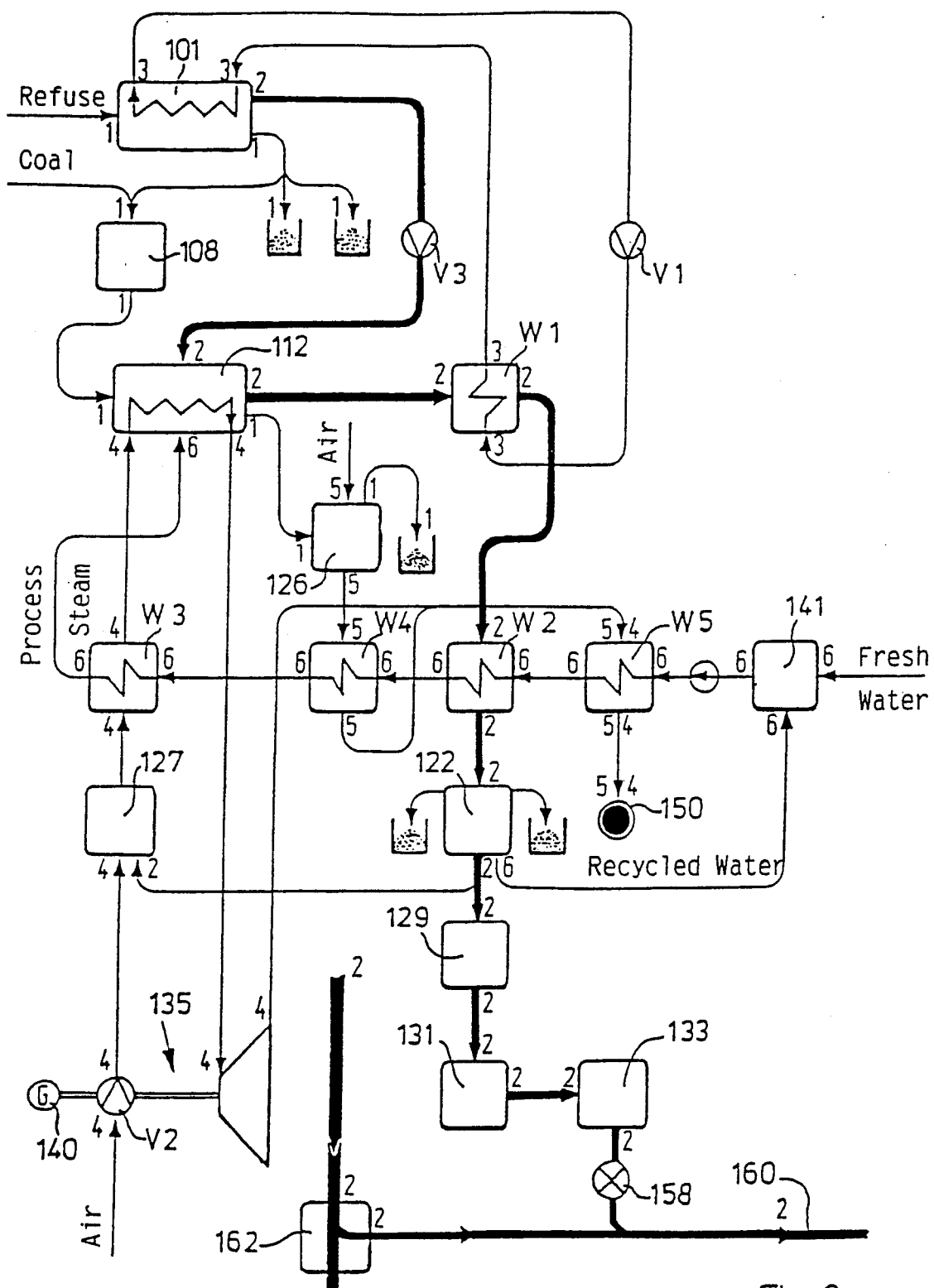
FIG. 2 shows another plant.

Hereafter, the further device, as well as the process carried out with its aid, will be described with reference to FIG. 2, as will be the paths taken by the different substances. Each path is identified by a number of between 1 and 6, which numbers have also been used for identifying the paths in FIG. 2.

Solid Matter Path (1)

The refuse introduced into the system is fed into the rotating drum of a low-temperature gas generator (101) and discharged from the latter's other end. In the case of the illustrated embodiment, the low-temperature gas generator 101 operates at a temperature of approximately 450° Centigrade and a pressure of 1 bar, i.e. at atmospheric pressure. Any metals and inert materials (glass, stones) present in the discharged material are sorted out. The remaining low-temperature carbonization residue is reduced to dust in a mill 108, together with the process coal. The dust is then supplied, for gasification, into a crude gas generator 112 operating at approximately 850° Centigrade and 10 bar. The gasification residue is discharged from the crude gas generator 112 and fed into a fluid-bed combustion chamber 126. The ash is discharged from the fluid-bed combustion chamber.

Fuel Gas Path (2)

The low-temperature gas produced in the low-temperature gas generator 101 is supplied to the crude gas generator 112 via a compressor V3. The crude gas produced by the crude gas generator 112 transmits part of its sensible heat to a thermal gas 1 (path 3) in a heat exchanger W1, and another part to the process steam (path 5) in a second heat exchanger W2. The crude gas is then purified in a purifying device 122 by which sulfur and toxic components are separated out from the crude gas. A small part of the pure gas flows to a combustion chamber 127, for the generation of the thermal gas 2 (path 4), while the largest part of the pure gas flows to a carbon monoxide conversion device 12 by which the toxic CO is converted with water into $H_2$ and $CO_2$. Thereafter, the carbon dioxide is washed out ($Co_2$ purification device 131), and the pure gas is supplied to a storage 133 from where it can be withdrawn for public utility services and fed, via a pressure-compensating device 158, into a gas distribution network 160 having an operating pressure of, for example, 8 bar which network communicates, via a remote-gas transfer station 126, with a remote gas distribution network having an operating pressure of, for example, 40 bar. In the case of the illustrated example, the pure gas has a calorific value of 4.6 kWh/$m^3$ and the following chemical composition: 83% hydrogen, 16% methane, 1% nitrogen.

Thermal Gas 1 Path (3)

The thermal gas 1 is heated in the heat exchanger W1 by the crude gas (path 2), in order to give off the absorbed heat in the low-temperature gas generator 101. The thermal gas 1 then returns to the heat exchanger, and so on, being moved by the compressor V1.

Thermal Gas 2 Path (4)

Air is compressed to the required pressure, by the compressor V2 of the explosion gas turbogenerator 135, and then burnt in the subsequent combustion chamber 27 together with pure gas, at an above-stoichiometric rate related to the thermal gas 2. The thermal gas 2 gives off part of its sensible heat to the process steam (path 6) in the steam superheater W3. Another part of its sensible heat serves to cover the heat demand of the crude gas generator 112. Thereafter, it serves in the explosion gas turbogenerator 135 for driving the compressor V2 and the electric generator 140, and finally for pre-heating the feed water for the process steam (path 6), whereafter it enters a chimney 150.

Thermal Gas 3 Path (5)

Air is taken in by the fluid-bed combustion chamber 126 and burnt together with the gasification residue from the solids path (1) to produce the thermal gas 3. The thermal gas 3 transmits its sensible heat to the process steam (path 6), via two heat exchangers W4, W5, and leaves the system through the chimney 150, being subjected during this latter step to a decontamination process, if this should be necessary.

Process Steam Path (6)

Fresh water and exhaust water from the purification stage of the fuel gas path (2) are treated in the water treatment plant 141 and pre-heated in the four heat exchangers W5, W2, W4, W3 of the path 6, and are then vaporized and superheated. The superheated process steam is fed into the crude gas generator 112. Part of the process water is recovered in the crude gas purification system 122, and returned to the water treatment plant (recycled water).

In the illustrated example, the low-temperature gas generator 101 takes the form of a rotary drum with tubular heat exchanger, and the crude gas generator 112 is a water-vapor fluid-bed reactor with tubular heat exchanger.

The grain size of coal, which is added in ground condition, is conveniently in the range of maximally 1 mm. From the knowledge gained so far it would appear that the optimally suited, greatest grain size of the ground low-temperature carbonization residue should be somewhat smaller than 1 mm, although values of above 1 mm are not excluded.

What is claimed is:

1. A method for producing from refuse a fuel gas suitable for public utility purposes, said method comprising the steps of:
    producing a carbonization gas and a carbonization residue from refuse in an externally heated low-temperature gas generator in the absence of oxygen and without any carbonization media;
    grinding the carbonization residue to a fine-grained dust;
    producing a crude gas and a gasification residue from both the carbonization gas and the dust in an externally heated crude gas generator, in the absence of air, with water, in the form of process steam, as a gasification medium, the sensible heat of the crude gas being used for heating the low-temperature gas generator and for superheating the process steam produced from the water;
    producing a fuel gas from the crude gas by purification; and
    producing a flue gas from the gasification residue in a gasification residue combustion chamber, wherein the sensible heat of the flue gas is used for superheating the process team.

2. The method according to claim 1, wherein the step of producing a carbonization gas and a carbonization residue includes passing the refuse into a rotary drum with a tubular heat exchanger.

3. The method according to claim 2 wherein the crude gas and gasification residue are produced in a water-vapor fluid-bed reactor with a tubular heat exchanger, and the flue gas is produced in a liquid-bed furnace, the method further comprising the steps of: burning a part of the fuel gas in a fuel gas combustion chamber to produce additional flue gas; using the additional flue gas to successively heat the crude gas generator, to drive an explosive gas turbine and to aid in superheating the process steam; using the explosive gas turbine for driving a compressor of a heating circuit of the crude gas generator, and operating the crude gas generator at a pressure of less than about 20 bars.

4. The method according to claim 1, wherein the step of producing a crude gas and a gasification residue includes passing the carbonization gas and the dust into a water vapor fluid-bed reactor with a tubular heat exchanger.

5. The method according to claim 1, wherein the step of producing a flue gas includes the step of passing the gasification residue into a liquid-bed furnace.

6. The method according to claim 1 wherein the step of producing a fuel gas includes carbon monoxide conversion and carbon dioxide purification.

7. The method according to claim 1, further comprising the step of burning a part of the fuel gas in a fuel-gas combustion chamber to produce a flue gas, wherein said flue gas produced in said fuel-gas combustion chamber is used for successively heating the crude gas generator, driving an explosive gas turbine and superheating the process steam.

8. The method according to claim 7, further comprising the step of using the explosive gas turbine to drive a compressor for heating of the crude gas generator.

9. The method according to claim 1, wherein the crude gas generator is operated at a pressure of less than 20 bar.

10. The method according to claim 1 wherein the crude gas generator is operated at a pressure of less than 10 bar.

11. The method according to claim 1 wherein the crude gas generator is operated at a pressure of about atmospheric pressure.

12. A device for producing a flue gas from refuse, the device comprising:
    allothermal low-temperature gas generator means for producing a carbonization gas and a carbonization residue from refuse in the absence of oxygen, said gas generator means including heat exchanger means for supplying necessary process heat;
    allothermal crude gas generator means for receiving said carbonization gas and carbonization residue and for producing a crude gas and a gasification residue from both said carbonization residue and carbonization gas in the absence of oxygen with water, in the form of process steam, as a gasification medium;
    gasification residue combustion chamber means for receiving the gasification residue from the crude gas generator means and for producing flue gas from said gasification residue;
    crude gas heat exchanger means for receiving the crude gas from the crude gas generator and for transmitting sensible heat of the crude gas to the low temperature gas generator means and to the process steam; and heat exchanger means for receiving the flue gas from the gasification residue combustion chamber and for transmitting sensible heat of the flue gas to the process steam.

13. The device according to claim 12 further comprising means for grinding the carbonization residue into a dust for delivery to said allothermal crude gas generator means.

14. The device according to claim 13 wherein the gasification-residue combustion chamber means comprises one of a group consisting essentially of a fluid-bed combustion chamber and a high-temperature slag-top furnace and the device further comprises: purification means for purifying the crude gas to provide a pure gas; a pure-gas combustion chamber means interconnected with the purification means for burning a partial flow of the pure gas; additional heat exchanger means, interconnected with the pure-gas combustion chamber means, for transmitting to the crude-gas generator means and to the process steam the heat generated in the pure-gas combustion chamber means; and an explosive gas turbine and compressor means, interconnected with the crude-gas generator means, for burning flue gas and providing superheated process steam to a heating circuit of the crude-gas generator means.

15. The device according to claim 12, wherein said gasification residue combustion chamber means comprises a fluid-bed combustion chamber.

16. The device according to claim 12 further comprising purification plant means, disposed for receiving crude gas from the crude gas heat exchanger means, for producing a pure gas from the crude gas.

17. The device according to claim 16 further comprising pure-gas combustion chamber means, disposed for receiving pure gas from the purification plant means, for generating thermal gas from a partial flow of the pure gas and a pure-gas combustion chamber flue gas, the pure-gas combustion chamber flue gas being fed to the crude gas heat exchanger means.

18. The device according to claim 17 further comprising explosive gas turbine and compressor means, disposed for receiving another partial flow of the pure gas, for burning the received pure gas and generating hot output gas which is fed to the crude gas heat exchanger means in order to provide heat to the crude gas generator means.

19. The device according to claim 12 wherein said gasification-residue combustion chamber means comprises a high temperature slag-tap furnace.

20. A method for producing from refuse in combination with coal, a fuel gas suitable for public utility purposes, said method comprising the steps of:
producing a carbonization gas and a carbonization residue from refuse in an externally heated low-temperature gas generator in the absence of oxygen and without any carbonization media;
grinding the carbonization residue with the addition of a desired quantity of coal to a fine-grained dust;
producing a crude gas and a gasification residue from both the carbonization gas and the dust in an externally heated crude gas generator, in the absence of oxygen, with water, in the form of process steam, as a gasification medium, the sensible heat of the crude gas being used for heating the low-temperature gas generator and for superheating the process steam produced from the water;
producing a pure gas from the crude gas by purification; and
producing a flue gas from the gasification residue in a gasification residue combustion chamber, wherein the sensible heat of the flue gas is used for superheating the process steam.

* * * * *